Oct. 1, 1968 H. V. CARTER 3,403,545
CHROMATOGRAPH HAVING A HEATED ENCLOSURE
Filed Oct. 2, 1964
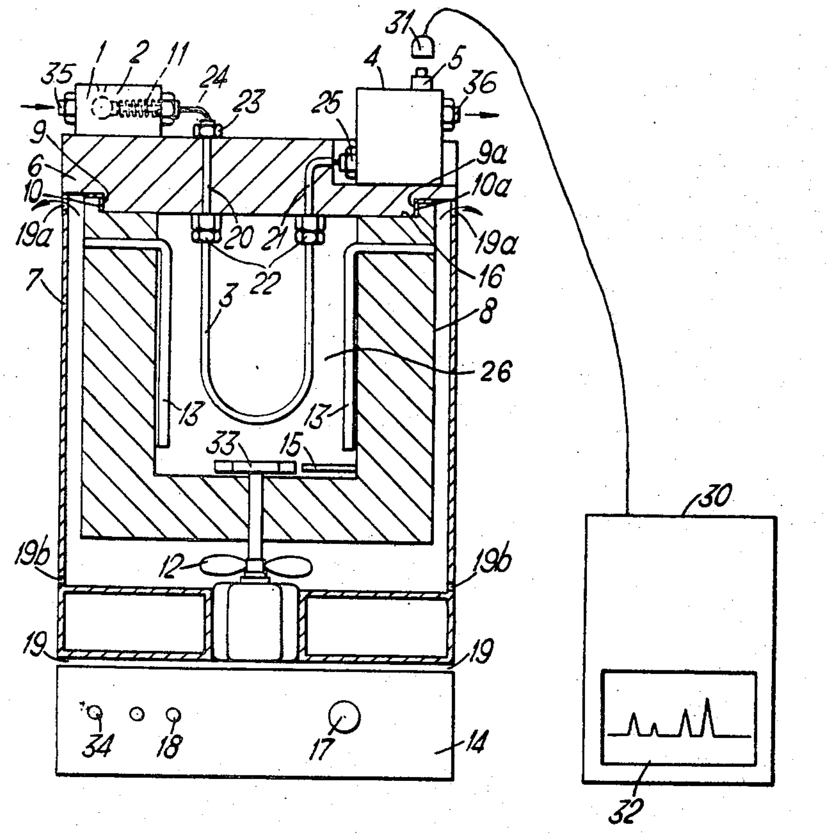
HARRY VINCENT CARTER
*Inventor*
By Daniel R. Levinson
*Attorney*

3,403,545
CHROMATOGRAPH HAVING A HEATED ENCLOSURE

Harry V. Carter, Beaconsfield, England, assignor to Perkin-Elmer Limited, Beaconsfield, England, a British company Filed Oct. 2, 1964, Ser. No. 401,106
Claims priority, application Great Britain, Oct. 14, 1963
40,451/63
4 Claims. (Cl. 73—23.1)

ABSTRACT OF THE DISCLOSURE

This gas chromatographic apparatus includes a temperature programming oven for the chromatographic column, one wall (e.g., the top) of which is a removable plate of thermally insulating material. The column is mounted on one side of the removable plate so as to be inside the oven; and the other components (i.e., the sample injector and the detector for the separated sample components) are mounted on the other side of the removable plate so as to be outside the oven. Preferably all of the components are also individually detachable from the plate, so as to allow interchange of different components for different analyses. This arrangement affords both great versatility and ease of operation when performing a series of different analyses.

This invention relates to apparatus for use in analytical techniques which require one or more members to be subjected to temperature conditions other than ambient temperature.

In apparatus for use in such analyses it is a common requirement that various components of the apparatus should be replaceable or interchangeable so that the range of the apparatus can be extended, or different sample materials can be tested using the same basic apparatus. When the material under analysis and the component parts of the apparatus are subjected to high or low temperatures, then these temperatures may introduce problems concerned with the design of other components of the apparatus. Difficulty is thus experienced in designing apparatus suitable for performing analyses of various different substances under varying temperature conditions.

According to the present invention apparatus for use in analysis requiring one or more components to be subjected to temperatures other than ambient temperature has this component or set of components arranged on one side of a plate of thermally insulating material, and a second component or set of components arranged on the other side of the plate, the components on the two sides of the plate being interconnected where required through the plate, and the plate is designed as a closure for an open side of a temperature enclosure.

It will be seen that this plate and the associated components form a unit which can be used to close a temperature enclosure and which will ensure that those components which need to be subjected to the temperature conditions within that enclosure are so subjected, while those components which should not be subjected to such temperatures are thermally insulated from the temperature enclosure by the plate and therefore remain at substantially ambient temperature. Use of apparatus according to the invention means that a large range of analyses can be performed using only a single temperature enclosure and changing the plate as required for one bearing a different set of components. Replacement of only a certain number of the components rather than the whole apparatus obviously means that less apparatus has to be kept on hand, and the cost of the analyses performed is reduced.

Preferably all the components are releasably mounted on the plate, and this leads to a further reduction in the apparatus needed to be kept, as it is often the case that one component out of those arranged on the plate will be suitable for more than one analysis.

Apparatus according to the invention is particularly suitable for use in gas chromatography and in this case, generally speaking, a chromatographic separating column will form the first component or one of the first set of components, and the second set of components will include a sample injector and a detector for generating electrical signals in response to gases passing therethrough. It is a well recognized problem in gas chromatography that while the actual column often needs to be held at a high temperature, the detector is sometimes unable to withstand these high temperatures. Apparatus according to the invention therefore makes possible an arrangement of components which overcomes this difficulty and allows a wider range of chromatographic analyses to be made with a smaller amount of apparatus than was previously the case. An example of apparatus according to the invention will now be described in more detail with reference to the accompanying drawing in which:

The sole figure is a schematic view of the apparatus, partly in section and partly in elevation.

The apparatus illustrated in for use in gas chromatography and includes a sample vaporizer 1 having an injection point 2, connected in series with a gas chromatographic column 3 and a detector 4 having an electrical output at 5. The detector may, in some cases, be extremely sensitive to temperature changes, and should then be mounted within its own separate, thermostatically controlled, heated enclosure. The chromatographic column 3 is arranged on one side of a plate 6 of thermally insulating material having a low thermal mass, a suitable material being that which is sold under the Registered British Trade Mark "Marinite." As well as being heat resistant this material is also corrosion resistant. The sample vaporizer and the detector are arranged on the other side of this plate, and the components are interconnected by a bore or tube 20 through the plate connecting the sample vaporizer to the column, and a further bore or tube 21 through the plate connecting the column to the detector. The chromatographic column 3 is releasably mounted on the plate by means of nuts 22 which also form a gas tight connection between the column and the bores 20 and 21 respectively. A further nut 23 forms a gas tight connection between a tube 24 leading from the sample vaporizer to the bore 20 through the plate. The bore 21 leads directly into the detector through a sealed coupling 25. Both the sample vaporizer and the detector are releasably mounted on the plate by means of bolts passing through lugs and screwing into tapped bores in the plate, this arrangement not being shown in the drawing.

The plate 6 is designed to form a lid for a temperature enclosure 26. The enclosure is bounded by insulated walls such as 8, the rear wall (not shown) being hinged to the oven base so that the back of the oven can be opened. The plate 6 rests on the upper surface 16 of these insulating walls. Clearances 9 and 9*a* respectively are allowed between an inwardly projecting boss-like part of the plate, and an outwardly projecting flange 10, 10*a* of the walls 8. The weight of the plate together with the components assembled on it is designed to be sufficient to ensure that the contact between the plate and the insulating walls is such that any thermal losses from the interface between the walls and the plate are reduced as far as possible.

For controlling the temperature within the enclosure 26 there is provided a heating unit comprising heaters 13, one on each side of the enclosure, which are supplied with electrical power from a circuit within a control part 14 of the unit. A thermostat 15, is positioned in the enclosure and can be set by a control 17. Below the lower insulating wall of the temperature enclosure is a motor-driven fan 12, controlled by a switch 18 and able to draw air in through channels 19 and circulate it around the outside of the insulating walls to exhaust it through slots 19*a* and 19*b* between the external wall of the heating compartment and the lower side of the plate 6. A further fan 33 is included in the enclosure and can be driven from the same motor as the fan 12 under control of a switch 34. This fan 33 ensures an even heating of the enclosure.

A recorder unit, shown generally as 30 is provided and can be connected to the electrical outlet 5 of the detector 4 by means of a connection 31. The recorder can be of any desired form and can produce a visual record as schematically indicated at 32.

In operation the necessary components comprising the sample vaporizer, the chromatographic column and the detector are fitted to the plate 6, and this is placed on the heating unit as shown so that the column projects into the temperature enclosure. The sample vaporizer is connected at 35 to a source of carrier gas, and the detector 4 is connected at 36 either to further apparatus for studying the gases issuing therefrom or to an atmospheric venting arrangement. Before an analysis is started, carrier gas is first allowed to flow through the column, and then the heating unit is set to the required temperature and allowed to reach this temperature, the carrier gas flowing continuously to prevent oxidation of the stationary phase within the column. A sample to be analyzed is then injected into the sample vaporizer at the point 2. This is vaporized by coming into contact with the heated body of the sample vaporizer which is heated by a heating coil 11, and the vaporized sample is then carried by the carrier gas through the bore 20 into the chromatographic column 3. Here the separation takes place in the usual way and the various constituents of the sample issue in turn through the bore 21 and pass through the detector 4. Electrical signals indicative of the various components are generated by the detector 4 and are indicated on the recorder 30.

After the analysis of this particular sample has been completed, it may be necessary to utilize a different set of apparatus components for a further analysis; and if this is the case, the lid bearing the first set of components is merely lifted off the heating unit, and a further lid carrying the new components is placed on the unit. The new assembly can have been made up while the first analysis was performed; and during the analysis using the second assembly, the first one may be stripped down and a different set of components assembled on the same lid.

It will be understood that if the second analysis is to take place at the same temperature as the first, the heating controls can be left switched on while the change-over is made. If the subsequent analysis is to be run at a lower temperature, then the thermostat can be re-set, the heating coil switched off, and either or both of the fans run for such time as is necessary to produce the required heat dissipation, before the new lid and associated components is placed on the enclosure. When rapid cooling is required the back of the enclosure is opened and the fan 33 run. If the further analysis requires a higher temperature, then a thermally insulating lid bearing no components may be placed on the enclosure which can be heated up very quickly without the fans running. Alternatively the new lid bearing the components can be placed on the enclosure, and this heating can take place before the sample is injected into the chromatographic column.

For the usual range of analyses it will be found that a single heating unit can produce a perfectly adequate temperature range, but for more unusual investigations it may be found necessary to use one or more heating units each extending the temperature range of the other units. The lid with the associated components is then required to be interchangeable between the different heating units, which are therefore made to conform to a standard size.

It will be apparent that the apparatus can be subjected to a number of detailed changes. In particular it is not limited to employment in gas chromatographic analyses, and the particular type of components that have been described as arranged on the plate may be replaced by entirely different components. The plate itself need not form the upper lid or cover of a temperature enclosure, but can alternatively be arranged to form one side, or even the bottom thereof. In such cases the plate can be held in position by bolts, or preferably by springs suitably shaped to hold the plate in close thermal engagement with the temperature enclosure and yet readily deformable to allow easy release of the plate. Marinite has been suggested as a suitable material for the plate, but it will be evident that other similar materials can also be used.

Although in the example given the separating column has been within the temperature enclosure, for some purposes it may be preferable to have the detector in the enclosure when this is to be held at an accurately controlled temperature. The column may then be at ambient temperature or means may be provided for controlling its temperature independently of that in the enclosure. The means may take the form of a simple separately heated temperature enclosure fitting over the column to rest on the lid. When using the lid inverted in this way the vaporizer can either be kept outside the main temperature enclosure or put with the detector within the oven. If kept outside the vaporizer also may be heated separately from either the column or the detector.

I claim:

1. 'Chromatographic apparatus for use in analysis, of the type requiring at least a first component, comprising a chromatographic separating column, to be maintained at a temperature different from ambient, comprising:
 - a thermally insulated temperature enclosure;
 - means for controlling the temperature within said enclosure;
 - a readily movable plate of thermally insulating material forming an openable wall of said temperature enclosure;
 - at least said first component comprising said chromatographic separating column, which is to be maintained at the controlled temperature within said enclosure, being mounted on the side of said plate facing the interior of said enclosure;
 - at least a second component comprising a sample injector, the operating temperature of which is desirably different from said controlled temperature, mounted on the opposite other side of said plate, so as to be outside of and thermally insulated from the interior of said enclosure;
 - and means extending through said plate for providing the necessry interconnections between said chromatographic separating column and said sample injector.

2. Chromatographic apparatus for use in analysis, of the type requiring at least a first component, comprising a chromatographic separating column, to be maintained at a temperature different from ambient, comprising:
 - a thermally insulated temperature enclosure; means for controlling the temperature within said enclosure;
 - a readily movable plate of thermally insulating material forming an openable wall of said temperature enclosure;
 - at least said first component comprising said chromatographic separating column, which is to be maintained at the controlled temperature within said enclosure, being mounted on the side of said plate facing the interior of said enclosure;
 - at least a second component comprising a detector for generating electrical signals in response to sample constitutents passing therethrough, the operating temperature of which is desirably different from said controlled temperature, mounted on the opposite other side of said plate, so as to be outside of and thermally insulated from the interior of said enclosure;

and means extending through said plate for providing the necessry interconnections between said chromatographic separating column and said detector.

3. A chromatographic apparatus according to claim 2, in which:

said detector comprises an electrical output connector for interconnection to a separate recorder device.

4. Apparatus according to claim 2, in which:

a sample injector is mounted on said opposite side of said plate, so as to be outside of and thermally insulated from the interior of said enclosure;

and means extending through said plate for connecting said sample injector to said chromatographic separating column.

References Cited

UNITED STATES PATENTS

| | | | |
|---|---|---|---|
| 3,212,319 | 10/1965 | Levy et al. | 73—15.4 |
| 2,963,898 | 12/1960 | Reynolds et al. | 73—23.1 |
| 3,069,894 | 12/1962 | Claudy | 73—23.1 |
| 3,124,952 | 3/1964 | Johnson | 73—23.1 |

OTHER REFERENCES

Emery et al.: Analytical Chemistry, vol. 33, No. 4, April 1961, pp. 523–527.

Simmons et al.: Analytical Chemistry, vol. 30, No. 1, January 1958, pp. 32–35.

RICHARD C. QUEISSER, *Primary Examiner.*

C. A. RUEHL, *Assistant Examiner.*